No. 718,434. PATENTED JAN. 13, 1903.
S. M. DAVIS.
HARROW CULTIVATOR.
APPLICATION FILED OCT. 4, 1902.
NO MODEL.

WITNESSES: INVENTOR.
Jas. E. Hutchinson Stephen M. Davis,
H. A. Farnham. by Swift and Co., Attorneys

UNITED STATES PATENT OFFICE.

STEPHEN M. DAVIS, OF NINETYSIX, SOUTH CAROLINA.

HARROW-CULTIVATOR.

SPECIFICATION forming part of Letters Patent No. 718,434, dated January 13, 1903.

Application filed October 4, 1902. Serial No. 125,852. (No model.)

*To all whom it may concern:*

Be it known that I, STEPHEN M. DAVIS, a citizen of the United States, residing at Ninetysix, in the county of Greenwood and State of South Carolina, have invented a new and useful Harrow-Cultivator; and I do hereby declare the following to be a full, clear, and exact description of the invention, such as will enable others skilled in the art to which it appertains to make and use the same.

The invention relates to a harrow-cultivator; and it has for its object to provide a simple, inexpensive, and efficient device of this character adapted to be arranged either as a harrow or as a combined harrow and cultivator.

The invention consists in the novel construction and arrangement of parts hereinafter described, and particularly pointed out in the claims hereto appended.

Figure 1:
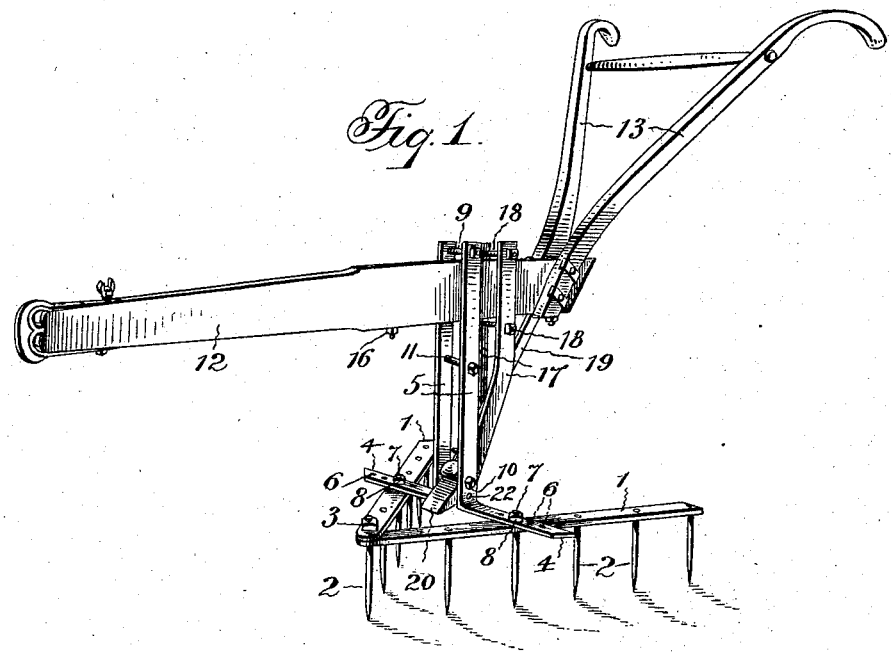
Figure 2:
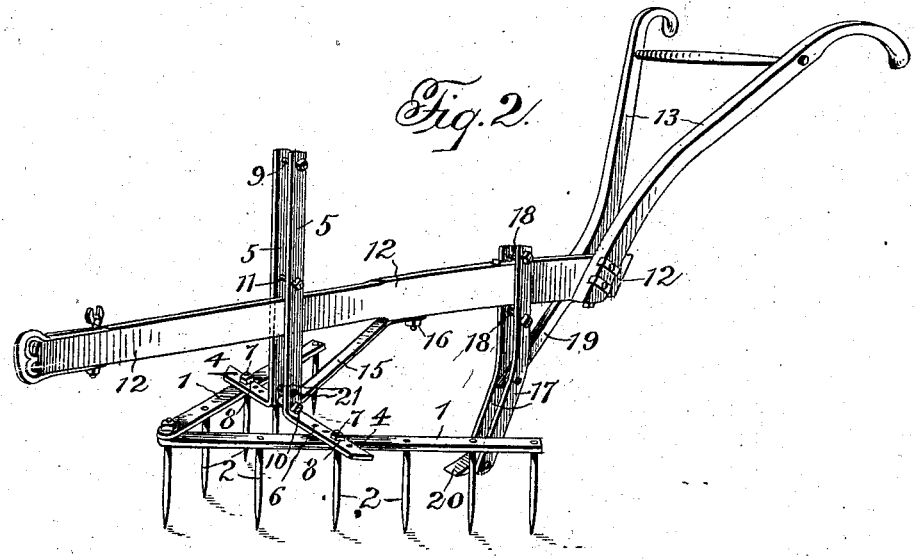

In the drawings forming part of this specification, and in which like numerals of reference designate corresponding parts, Figure 1 is a perspective view of a harrow constructed in accordance with this invention. Fig. 2 is a similar view illustrating another arrangement of the parts.

Referring to the drawings, 1 designates a pair of harrow-wings consisting of bars provided at intervals with depending spikes or teeth 2, the front spike or tooth being extended upward through both of the bars and forming a pivot for the same. The wings which diverge rearwardly are adapted to be swung inward or outward on the said pivot, and they are secured at the desired angle by means of horizontal lateral-extending arms of a pair of upright bars. The front tooth or spike is provided at its upper end with a nut 3, and the arms 4 of the upright bars 5 are provided at intervals with perforations 6 to receive the extended end 7 of the adjacent harrow teeth or spikes. The upper extended ends 7 of the teeth or spikes are threaded for the reception of nuts 8, which clamp the parts firmly together.

The upright bars 5 are connected by upper, lower, and intermediate bolts 9, 10, and 11 and are spaced apart to receive a plow stock or beam 12 of the ordinary construction provided at the rear end with plow-handles 13 and having a suitable clevis at the front end.

The bolts 9, 10, and 11 firmly clamp the plow-beam between the upright bars 5 of the harrow, which is adjustable both vertically and longitudinally of the beam and which is adapted to be arranged in either of the positions illustrated in Figs. 1 and 2 of the drawings.

When the wings are arranged as shown in Fig. 2, the harrow-frame formed by the wings and the upright bars is braced by an inclined bar 15, secured at its upper end to the plow-beam by a screw 16 or other suitable fastening device and attached to the upright bars at the bottoms thereof by the lower bolt 10, which passes through a suitable eye of the inclined bar or brace 15.

The plow-beam is provided near its rear end with a pair of depending standards 17, clamped to the said plow-beam by means of bolts 18 and supported by an inclined brace 19. The bolts 18 are located above and below the plow-beam, and the inclined brace 19, which has its lower end secured between the standards 17 at a point at a center thereof, extends rearward and upward therefrom and is secured at its upper end to the lower edge of the plow-beam. Secured between the lower ends of the standard is a plow-foot 20; but a shovel or other cultivator-tooth may be employed, if desired.

The upright bars of the harrow-frame may be arranged near the center of the plow-beam, as illustrated in Fig. 2 of the drawings, or the harrow-frame may be arranged at the back of the plow-beam, as shown in Fig. 1. When the harrow-frame is arranged at the back of the plow-beam, the lower bolt 10 is moved to a pair of perforations 21 and the plow-foot is clamped between the lower portions of the upright bars. The perforations 21 are located a short distance above the bottom perforations 22, which receive the lower bolt when the parts are arranged as shown in Fig. 2.

It will be seen that the device is exceedingly simple and inexpensive in construction, that it possesses great strength and durability, that it is readily adjustable to provide a simple harrow, a combined harrow and cultivator.

What I claim is—

1. The combination with a plow-beam, of standards secured to the plow-beam and depending therefrom, harrow-wings, and upright bars connecting the harrow-wings and forming a clamp for adjustably engaging the plow-beam, said upright bars being adjustable vertically and longitudinally of the plow-beam to arrange them at the standards and at a point in advance of the same and being capable also of clamping the lower ends of the standards, substantially as described.

2. The combination with a plow-beam, of standards secured to the plow-beam and provided with a soil-engaging device, harrow-wings pivotally connected, and a pair of upright bars forming a clamp for adjustably engaging the plow-beam and the lower ends of the standards and provided with laterally-extending arms adjustably secured to the wings, substantially as described.

3. The combination with a plow-beam, of standards secured to the plow-beam and provided with a foot, harrow-wings pivotally connected, a pair of upright bars arranged at opposite sides of the plow-beam and provided with laterally-extending arms adjustably secured to the wings, and upper, lower and intermediate fastening devices connecting the upright bars, the lower fastening device being adjustable to provide a space for the foot of the standards, substantially as described.

In testimony whereof I have hereto affixed my signature in the presence of two witnesses.

STEPHEN M. DAVIS.

Witnesses:
JOHN W. LESESNE,
JNO. B. SLOAN.